United States Patent
Sidhu et al.

(10) Patent No.: US 7,131,028 B2
(45) Date of Patent: Oct. 31, 2006

(54) SYSTEM AND METHOD FOR INTERCONNECTING NODES OF A REDUNDANT COMPUTER SYSTEM

(75) Inventors: Balkar S. Sidhu, San Jose, CA (US); Ramani Krishnamurthy, Fremont, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 559 days.

(21) Appl. No.: 10/317,520

(22) Filed: Dec. 11, 2002

(65) Prior Publication Data

US 2004/0153695 A1    Aug. 5, 2004

(51) Int. Cl.
*G06F 11/00* (2006.01)
(52) U.S. Cl. .......................................... 714/11; 714/13
(58) Field of Classification Search ............... 714/10, 714/11, 12, 13
See application file for complete search history.

(56) References Cited

U.S. PATENT DOCUMENTS

| | | | | | |
|---|---|---|---|---|---|
| 4,610,013 | A | * | 9/1986 | Long et al. | 714/11 |
| 5,313,386 | A | * | 5/1994 | Cook et al. | 700/82 |
| 5,696,895 | A | * | 12/1997 | Hemphill et al. | 714/4 |
| 5,963,979 | A | * | 10/1999 | Inoue | 711/162 |
| 6,496,940 | B1 | * | 12/2002 | Horst et al. | 714/4 |
| 6,505,305 | B1 | * | 1/2003 | Olarig | 714/5 |
| 6,658,595 | B1 | * | 12/2003 | Thamattoor | 714/11 |
| 2003/0037133 | A1 | * | 2/2003 | Owens | 709/223 |

OTHER PUBLICATIONS

Microsoft Press Computer Dictionary Third Edition, "grounding", Microsoft Press, 1997, pp. 222-223.*

RadiSys.; Platform Management; MD2000 Platform Management Overview; P/N 007-01138-000; Oct. 2000, 2000 RadiSys Corporation; 1-4; Platform Management And Alarming; pp. 1-6; Components; pp. 7-14.
Intel; IPMI v1.5 Overview, 2001 Intel Corporation; pp. 1-4.
Intelligent Platform Management Interface; IPMI Specification Version 1.0 Available, http://developer.intel.com/design/servers/ipmi/spec.htm; Jul. 1, 2002, pp. 1-2.
PCI International Computer Manufacturer Group (PICMG) Releases Compact PCI System Management Specification; Release Apr.'00, Apr. 18, 2000; http://www.picmgeu.org/press_releases/release_april.htm; pp. 1-3; Jul. 1, 2002.
CompactPCI Keeps Plugging Away; Special Report; CompactCPI Goes To Town, By: David B. Cotton; Jun. 2001; pp. 38, 40-43.

(Continued)

*Primary Examiner*—Scott Baderman
*Assistant Examiner*—Gabriel L. Chu
(74) *Attorney, Agent, or Firm*—Meyertons Hood Kivlin Kowert & Goetzel, P.C.; B. Noël Kivlin

(57) ABSTRACT

An interconnect system connects two drawers of a redundant computer system, wherein each drawer contains a redundant node of the computer system. A first signal source and a first signal preventer are operatively associated with a first drawer of the two drawers. A second signal source and a second signal preventer are operatively associated with a second drawer of the two drawers. Each of the two drawers has a connection interface that includes a plurality of terminals connected to a redundant node of the drawer. A redundant system may be provided by connecting the connection interfaces with a connector. The connecter is further configured to connect the first signal source to the second signal preventer, and the second signal source to the first signal preventer, thereby signaling each drawer that the computer system may be operated in a redundant mode. If the connector is disconnected, the connection between the first signal source and the second signal preventer, and between the second signal source and the first signal preventer, are also disconnected, thereby signaling each drawer that the computer system cannot be operated in a redundant mode.

17 Claims, 2 Drawing Sheets

OTHER PUBLICATIONS

CompactPCI: Here, There And (Almost) Everywhere; Special Report; CompactPCI Goes To Town, By: Jon Kenton and Dennis Liles; RTC Jun. 2001; pp. 48, 50, 52-53.

Bridging Beyond Eight Slots Part II: A Bridge Over Troubled Waters?; Special Report; CompactPCI Goes To Town, By: Tom Sutherland; Jun. 2001 RIC; pp. 57-61.

* cited by examiner

SYSTEM AND METHOD FOR INTERCONNECTING NODES OF A REDUNDANT COMPUTER SYSTEM

BACKGROUND OF THE INVENTION

1. Field of the Invention

The present invention relates to redundant computer systems for computer servers and the like, and more particularly, to a system and method for interconnecting redundant systems.

2. Description of Related Art

Redundant systems are appropriate for various computing applications. As used herein, redundancy refers to duplication of electronic elements to provide alternative functional channels in case of failure, and a redundant node or element is one that provides this redundancy. A redundant system is a system containing redundant nodes or elements for primary system functions.

In a redundant computing system, two or more computers are utilized to perform a processing function in parallel. If one computer of the system fails, the other systems are capable of handling the processing function, so that the system as a whole can continue to operate. Redundant computing systems have been designed for many different applications, using many different architectures. In general, as computer capabilities and standards evolve and change, so do the optimal architectures for redundant systems.

For example, a standard may permit or require that the connectivity architecture for a redundant system be Ethernet-based. One such standard is the PCI Industrial Computer Manufacturers Group (PICMG) PSB Standard No. 2.16, about which more information may be obtained at www.picmg.com. In an Ethernet-based system, redundant nodes of the system communicate using an Ethernet protocol. Such systems may be particularly appropriate for redundant server applications. A redundant server comprises two or more separate computer servers (herein called "drawers") connected by a suitable interconnect.

It is desired, therefore, to provide a redundant system suitable for use with an Ethernet-based connectivity architecture, and with other connectivity architectures. It is further desired to provide a system and method for interconnecting drawers of the redundant system. The system and method should support operation of the drawers in a redundant mode. That is, if one drawer of the system experiences a failure, the other drawer or drawers of the system should be able to assume the processing function that has been lost by the failure, via an interconnection. At the same time, the system and method should provide that if the interconnection fails (i.e., if there is a "connection failure"), it is immediately detected by each affected drawer. The connection failure may then be reported, and the affected drawers may operate in a non-redundant mode until the connection failure can be repaired.

SUMMARY OF THE INVENTION

The present invention provides an interconnect system suitable for connecting drawers of a redundant computer system. The interconnect system may be used with Ethernet-based systems, although it is not thereby limited. A connection architecture is provided that permits redundant operation of both Ethernet ports (each node board having two Ethernet ports) and Central Processing Units (CPU's) for higher-level functions, such as drawer management or computation. In addition to providing the connections needed for redundant computing, the interconnect system also provides for signaling of the connection state to a drawer-management CPU or other processor in each of the drawers. When the redundant drawer elements are interconnected, the signaling provides that a pin of the processor is in a first state, indicating that redundancy is available. If or when interconnectivity is lost, the processor pin reverts to a second state, indicating that redundancy is not available.

An interconnect method according to the invention includes steps as follows. A first signal source and a first signal preventer are provided in operative association with a first drawer containing a redundant node(s). A signal source may be any device for generating an electrical signal, and a signal preventer may be any device that, when connected to a signal source, cancels or otherwise prevents the signal from the signal source. Specific examples of suitable devices are provided in the detailed description that follows. An operative association with a drawer may be provided by incorporating a signal source or preventer device in a circuit board of the drawer, by attaching a device to a component of the drawer, or as otherwise known in the art. A second signal source and a second signal preventer are also provided in operative association with a second drawer containing a redundant node, and the second signal source is connected to a management processor of the second drawer.

The redundant nodes of the two drawers may then be connected with a suitably configured connector, such as an electrical cable. The same connector connects the first signal source to the second signal preventer, and the second signal source to the first signal preventer. Hence, while the connector is connected to both drawers, signals from the signal source are prevented from reaching management processors of both drawers. If the connector is disconnected, signals from the signal source are not prevented, and are communicated to the management processors. The change in signal state that accompanies any disconnection of the connector may be used as an indicator that redundancy is no longer available. Based on the signal state, the Management Processor may activate a non-redundant operating mode and/or turn on a visual indicator, such as a panel light, or an audible alarm or other audible indicator. Conversely, when the connection is restored, a redundant operating mode may be activated.

A more complete understanding of the system and method for interconnecting nodes of a redundant computer system will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

The present invention provides a method and system for interconnecting nodes of a redundant computer system, that overcomes the limitations of the prior art. The system and method are applicable to systems of plural servers, which comprise plural servers each having at least one Ethernet link port and at least one server management controller, wherein the link ports and server management controllers of at least two of the plural servers are connected. A server is a general-purpose computer, such as may be programmed to perform different computing functions, including but not limited to routing traffic and data over a wide area network, such as the Internet; managing storage and retrieval of data, data processing, and so forth. In a redundant system comprising multiple servers, the servers may be referred to as drawers, and individually, as a drawer.

Figure 1:
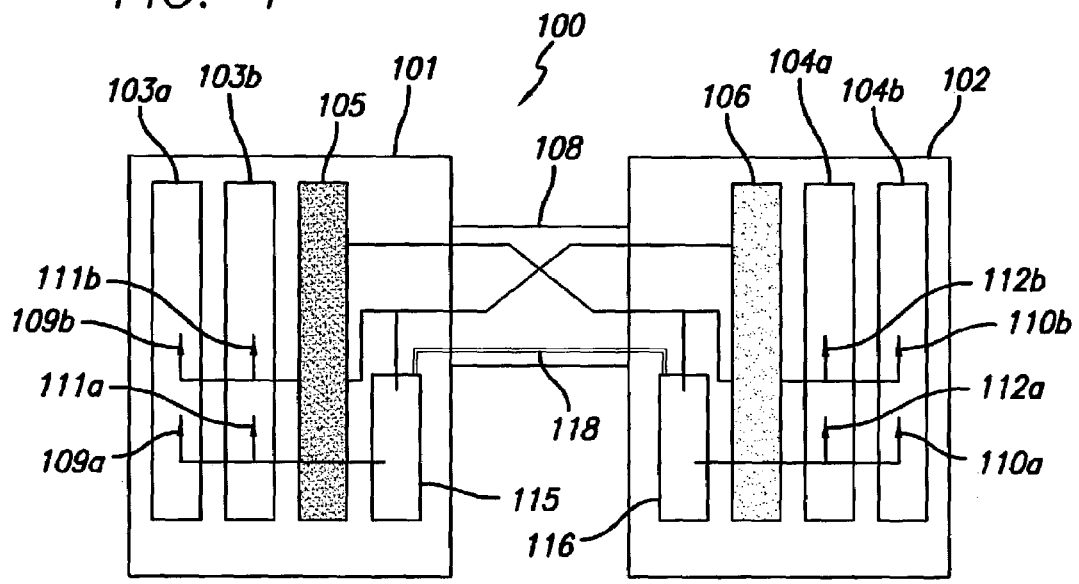
FIG. 1 is a block diagram of a redundant system according to the invention.

An exemplary system 100 comprising drawers 101 and 102 is shown in FIG. 1. While two drawers are shown, it should be apparent that any plural number of drawers may comprise a redundant system. Each drawer comprises a plurality of node boards 103a–b and 104a–b (two of many shown). Any number of node boards may be provided; for example, eight node boards may be provided. Each node board may provide two or more Ethernet ports. The node boards may be compliant with an industry standard, for example, PICMG standard No. 2.16. Each drawer further comprises Ethernet switch fabric cards 105, 106, respectively, for providing Ethernet switching functions for the node cards. Switch fabric card 105 controls switching for ports 109a, 111a of drawer 101. When drawers 101, 102 are connected by connector 108, switch fabric card 105 controls switching for ports 110b, 112b of drawer 102. Similarly, in drawer 102, switch fabric card 106 controls switching for ports 110a, 112a, and for ports 109b, 111b when drawers 101, 102 are connected together.

Each drawer 101, 102 further comprises a drawer management card (DMC) 115, 116, respectively, for managing operation of the drawers. DMC 115 manages operation of drawer 101. In addition, DMC 115 may manage operation of drawer 102, if drawers 101, 102 are connected and DMC 116 becomes disabled. In like manner, DMC 116 manages operation of drawer 102, and may manage drawer 101 if DMC 115 becomes disabled. Connector 108 includes a suitable link 118 to permit redundant operation of DMC's 115, 116. Within each drawer, the DMC, switch card, and node boards may be connected by a midplane board (not shown).

Thus, redundant operation of node card Ethernet ports is available whenever connector 108 connects drawers 101, 102. For example, if one of the Ethernet ports (e.g., link ports) fails on any of the node cards, then the second link port on the failed node card will still be able to communicate to the switch in the second drawer, thereby allowing uninterrupted operation of that node card. Also, if one of switch cards 105, 106 fails, the node cards may communicate with the remaining operable switch card via their second Ethernet port. For example, if switch card 106 becomes inoperative, node cards 104a, 104b will determine that Ethernet ports 112a, 112b are inoperative and will use ports 112b, 110b to communicate with switch card 105, and operation of system 100 can be maintained.

If connection 108 becomes disconnected, redundant operation of system 100 is lost, but system 100 may still be capable of functioning in a non-redundant mode. In a non-redundant mode, drawers 101, 102 operate independently to perform the functions of system 100. In the non-redundant mode, drawers 101, 102 are preferably configured such that the failure of a single Ethernet port does not make the node board where the failure occurred inoperative; instead, traffic may be directed to the operable second port on the node board. Of course, if a switch card or DMC failure occurs, redundancy within the drawer may not be available, and, depending on the severity of the switch card failure, the affected drawer may fail.

It is desirable, therefore, to provide a mechanism by which the DMC of each drawer is alerted when connector 108 becomes inoperative. For example, in an embodiment of the invention, connector 108 comprises a cable having an end attached to each drawer of the system. If any of the cable ends becomes disconnected, the DMC's of both affected drawers should be interrupted, thereby initiating a non-redundant mode. That is, with reference to FIG. 1, if an end of connector 108 attached to drawer 101 becomes disconnected, both DMC 115 and DMC 116 should be alerted. A system operator may also be alerted to the loss of redundancy, such as through activation of a visible or audible indicator on a system front panel, or by any other suitable method.

Figure 2:
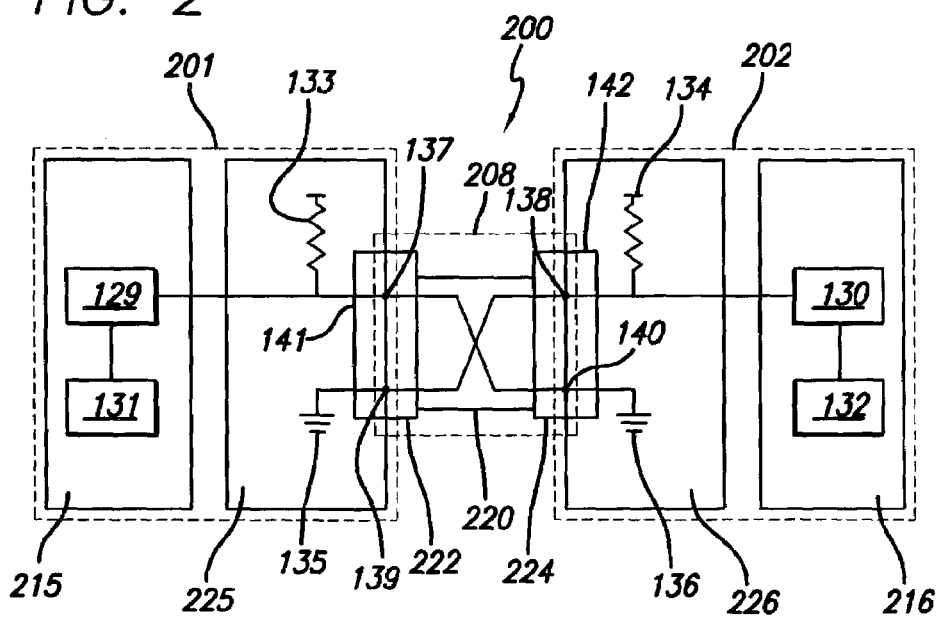
FIG. 2 is a block diagram showing an exemplary interconnect system for a redundant computer system according to an embodiment of the invention.

FIG. 2 shows an exemplary redundant system 200 comprising a drawer 201 connected to a drawer 202 by a connector 208. Connector 208 may comprise a cable 220 having a first end 222 connected to a midplane board 225 of drawer 201 and a second end 224 connected to a midplane board 226 of drawer 202. Drawer 201 further comprises a DMC 215 and a plurality of node cards (not shown) with a switch card (not shown) configured as shown in FIG. 1. Likewise, drawer 202 comprises a DMC 216 and a plurality of node cards with a switch card. DMC's 215, 216 each comprise a central processing unit (CPU) 129, 130, respectively connected to memories 131, 132 containing software for performing a connection-detection method according to the invention.

Midplane boards 225, 226 each include a signal source 133, 134 and a signal preventer 135, 136. In an embodiment of the invention, each signal source 133, 134 comprises a pull-up voltage in series with a resistor, and each signal preventer 135, 136 comprises a connection to ground. Signal source 133 and signal preventer 135 are respectively connected to terminals 137, 139 of connector interface 141. A plurality of terminals for redundant nodes of drawer 201 are also provided in interface 141. Similarly, signal source 134 and preventer 136 are respectively connected to terminals 138, 140 of connector interface 142, along with a plurality of terminals for redundant nodes of drawer 202. Connector interfaces 141, 142 are adapted to connect to ends 222, 224, respectively, of connector 208. For example, connector interface 141 may comprise a socket for a cable connector, and end 222 may comprise a connector plug.

Thus, when connector 208 is connected to both drawers 201, 202, signal source 133 in drawer 201 is connected to an interrupt pin of CPU 129 in drawer 201, or to any other pin that can be used by the CPU to detect a change in state of the signal source 133, and to a signal preventer 136 in drawer 202. The interrupt pin of CPU 129 (or any other pin that can be used by the CPU to monitor a signal source) will therefore be held in a low (no signal) state, which will be interpreted by the CPU as indicating that the drawers are connected. Drawer 201 may therefore be managed in a redundant mode. Likewise, signal source 134 in drawer 202 is connected to an interrupt pin of CPU 130 in drawer 202, and to a signal preventer 135 in drawer 201. Drawer 202 may therefore also be managed in a redundant mode.

It should therefore be apparent that, if connector 208 is not connected to either of drawers 201, 202, the interrupts of CPU's 129, 130 will change to a high (signaled) state. This will be interpreted as indicating that drawers 201, 202 are not connected, and each drawer will be operated in a non-redundant mode. In addition, a system operator may be alerted that the drawers are disconnected, so that appropriate action may be taken to reconnect the drawers.

Various different devices may be used for signal sources 133, 134 and signal preventer 135, 136. For example, the signal source may be a connection to ground through a resistor, and the signal preventer may be a pull-up voltage. For further example, a signal source may be an oscillating constant frequency signal, and the signal preventer may be a oscillating signal having the same frequency and amplitude as the source, but 180° out of phase. The signal preventer need not nullify or cancel the signal. It is sufficient for the preventer to cause a detectable change of the signal state when connected to the signal source. For example, the preventer may be a connection to a higher (or lower) voltage than the signal source.

Figure 3:
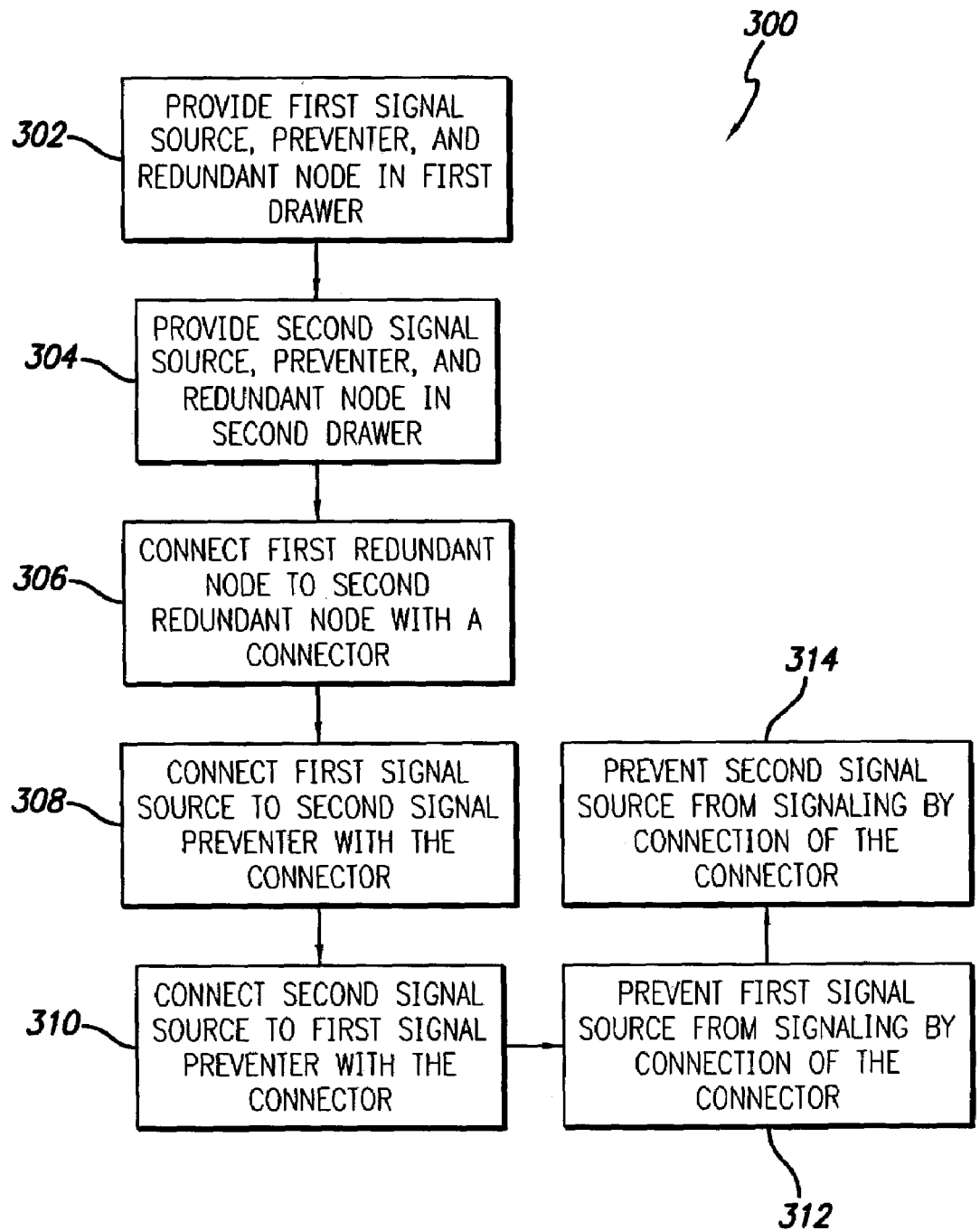
FIG. 3 is a flow diagram showing exemplary steps of a method according to the invention.

In general according to the foregoing, the invention provides a method 300 for connecting two drawers of a redundant system, as diagrammed in FIG. 3. At step 302, a first signal source, a first signal preventer, and a first redundant node are operatively associated with a first drawer of the two drawers. One method of operatively associating the foregoing elements is to connect them via a midplane board of the drawer, although the invention is not limited thereby. An alternative method may be to include the source and/or preventer on one or more modules that are connected to a connector terminal for the drawer. The first signal source is connected to a processor (CPU) of the first drawer, such as through a midplane of the drawer.

At step 304, complementary actions are performed with respect to a second drawer of the two drawers. A second signal source, second signal preventer, and second redundant node are provided and operatively associated with the second drawer. The second signal source is connected to a processor (CPU) of the second drawer.

At step 306, the first redundant node is connected to the second redundant node by a connector. It is this connection that enables the drawers to operate in a redundant mode. If each drawer has more than one redundant node, these other nodes are preferably also connected with the connector. At step 308, the first signal source is connected to the second signal preventer by the connector. At step 310, the second signal source is connected to the first signal preventer by the connector.

As a consequence of the foregoing steps, any disconnection of the redundant nodes will also cause a disconnection of the signal sources from the respective signal preventers. If, for example, the first signal source is disconnected from the second signal preventer, the processor of the first drawer will receive a signal indicating that the connection is broken. The first processor may then activate a non-redundant operating mode.

At step 312, the first signal source is prevented from signaling to the processor of the first drawer by connection of the connector. This may be accomplished by passive operation of the second signal preventer, and hence may be inherently completed by completion of step 308. In the alternative, the second signal preventer may be activated by connection of the connector; for example, a signal from the first signal source may be detected in the second drawer, causing the second signal preventer to be activated. In complementary fashion, at step 314, the second signal source is prevented from signaling to the processor of the second drawer by connection of the connector. The absence of a signal is interpreted in both drawers as meaning that the connector is in place and redundant operation is possible.

The processors of the respective drawers may then activate a redundant operating mode in each drawer.

Having thus described a preferred embodiment of a system and method for interconnecting nodes of a redundant computer system, it should be apparent to those skilled in the art that certain advantages of the within system have been achieved. It should also be appreciated that various modifications, adaptations, and alternative embodiments thereof may be made within the scope and spirit of the present invention. For example, system using an electrical cable to connect two drawers of a redundant system has been illustrated, but it should be apparent that the inventive concepts described above would be equally applicable to systems that use other types of connectors, or that use more than two drawers. The invention is further defined by the following claims.

What is claimed is:

1. An interconnect system for connecting at least two drawers of a redundant system, each drawer containing a redundant node, the interconnect system comprising:

a first signal source and a first signal preventer operatively associated with a first drawer of the two drawers, the first signal source connected to a first processor in the first drawer and to a first signal terminal of the first drawer, and the first signal preventer connected to a first preventer terminal of the first drawer;

a first connection interface connected to the first-drawer, comprising the first signal terminal, the first preventer terminal, and a first plurality of terminals connected to a redundant node of the first drawer;

a second signal source and a second signal preventer operatively associated with a second drawer of the two drawers, the second signal source connected to a second processor in the second drawer and to a second signal terminal of the second drawer, and the second signal preventer connected to a second preventer terminal of the second drawer;

a second connection interface connected to the second drawer, comprising the second signal terminal, the second preventer terminal, and a second plurality of terminals connected to a redundant node of the second drawer; and an electrical connector connecting the first connection interface to the second connection interface, whereby the first signal terminal is connected to the second preventer terminal, the second signal terminal is connected to the first preventer terminal, and the first plurality of terminals is connected to the second plurality of terminals;

wherein the first signal source comprises a connection to a first voltage source through a first resistor and the second signal preventer comprises a connection to an electrical ground;

wherein making an electrical connection between the first signal terminal and the second preventer terminal causes:

a first electric current to flow through the first resistor from the first signal source to the second signal preventer; and a first voltage state at the first signal terminal indicating that redundant operation is available; and wherein breaking an electrical connection between the first signal terminal and the second preventer terminal causes:

a second voltage state at the first signal terminal, different from the first voltage state and indicating that redundant operation is not available.

2. The interconnect system of claim 1,
wherein the second signal source comprises a connection to a second voltage source through a second resistor and the first signal preventer comprises a connection to an electrical ground;
wherein making an electrical connection between the second signal terminal and the first preventer terminal causes:
a second electric current to flow through the second resistor from the second signal source to the first signal preventer; and
a third voltage state at the second signal terminal indicating that redundant operation is available; and
wherein breaking an electrical connection between the second signal terminal and the first preventer terminal causes a fourth voltage state at the second signal terminal, different from the third voltage state and indicating that redundant operation is not available.

3. The interconnect system of claim 2, wherein the electrical connector comprises a cable.

4. The interconnect system of claim 1, wherein:
breaking an electrical connection between the first signal terminal and the second preventer terminal prevents the first electric current from flowing from the first signal source to the second signal preventer; and
breaking an electrical connection between the second signal terminal and the first preventer terminal prevents the second electric current from flowing from the second signal source to the first signal preventer.

5. The interconnect system of claim 2, wherein the second voltage state triggers an interrupt of the first processor.

6. The interconnect system of claim 5, further comprising software in a memory connected to the first processor, the software comprising instructions for activating a non-redundant mode when the interrupt of the first processor is triggered, by a second voltage state at the first signal terminal.

7. The interconnect system of claim 5, further comprising software in a memory connected to the first processor, the software comprising instructions for activating an indicator when the interrupt of the first processor is triggered by a second voltage state at the first signal terminal.

8. The interconnect system of claim 5, further comprising software in a memory connected to the first processor, the software comprising instructions for activating a redundant mode when the interrupt of the first processor is not triggered by a second voltage state at the first signal terminal.

9. An interconnect system for connecting at least two drawers of a redundant system, each drawer containing a redundant node, the interconnect system comprising:
first signaling means for signaling a first processor of the first drawer and first preventing means for preventing signaling of the first processor, the first signaling means and the first preventing means operatively associated with a first drawer of the two drawers;
second signaling means for signaling a second processor of the second drawer and second preventing means for preventing signaling of the second processor, the second signaling means and the second preventing means operatively associated with a second drawer of the two drawers; and
connection means for connecting a first redundant node of the first drawer to a second redundant node of the second drawer, the first signaling means to the second preventing means, and the second preventing means to the first signaling means;
wherein the first signaling means comprises a connection to a first voltage source through a first resistor and the second preventing means comprises a connection to an electrical ground;
wherein connecting the first signaling means to the second preventing means causes a first electric current to flow through the first resistor from the first signaling means to the second preventing means, causing a first signaling state at the first signaling means indicating that redundant operation is available; and
wherein disconnecting the first signaling means from the second preventing means causes a second signaling state at the first signaling means, different from the first signaling state and indicating that redundant operation is not available.

10. The interconnect system of claim 9,
wherein the second signaling means comprises a connection to a second voltage source through a second resistor and the first preventing means comprises a connection to an electrical ground;
wherein connecting the second signaling means to the first preventing means causes a second electric current to flow through the second resistor from the second signaling means to the first preventing means, causing a third signaling state at the second signaling means indicating that redundant operation is available; and
wherein disconnecting the second signaling means from the first preventing means causes a fourth signaling state at the second signaling means, different from the third signaling state and indicating that redundant operation is not available.

11. The interconnect system of claim 10,
wherein disconnecting the first signaling means from the second preventing means prevents the first electric current from flowing from the first signaling means to the second preventing means; and
wherein disconnecting the second signaling means from the first preventing means prevents the second electric current from flowing from the second signaling means to the first preventing means.

12. A method for connecting at least two drawers of a redundant system, each drawer containing a redundant node, the method comprising the steps of:
providing a first signal source, a first signal preventer a first signal terminal, and a first redundant node operatively associated with a first drawer of the two drawers, the first signal source connected to a first processor of the first drawer and to the first signal terminal, wherein the first signal source comprises a connection to a first voltage source through a first resistor and the second signal preventer comprises a connection to an electrical ground;
providing a second signal source, a second signal preventer, a second signal terminal, and a second redundant node operatively associated with a second drawer of the two drawers, the second signal source connected to a second processor of the second drawer and to the second signal terminal;
connecting the first redundant node to the second redundant node, the first signal terminal to the second signal preventer, and the second signal terminal to the first signal preventer;
wherein connecting the first signal terminal to the second signal preventer causes:
a first electric current to flow through the first resistor from the first voltage source to the second signal preventer; and
a first voltage state at the first signal terminal indicating that redundant operation is available; and wherein disconnecting the first signal terminal from the second preventer causes a second voltage state at the first signal terminal, different from the first voltage state, and indicating that redundant operation is not available.

13. The method of claim 12,
wherein the second signal source comprises a connection to a second voltage source through a second resistor and the first signal preventer comprises a connection to an electrical ground;
wherein connecting the second signal terminal to the first signal preventer causes:
   a second electric current to flow through the second resistor from the second voltage source to the first signal preventer; and
      a third voltage state at the second signal terminal indicating that redundant operation is available; and
wherein disconnecting the second signal terminal from the first signal preventer causes a fourth voltage state at the second signal terminal, different from the third voltage state and indicating that redundant operation is not available.

14. The method of claim 13,
wherein disconnecting the first signal terminal from the second signal preventer prevents the first electric current from flowing from the first voltage source to the second signal preventer; and
   wherein disconnecting the second signal terminal from the first signal preventer prevents the second electric current from flowing from the second voltage source to the first signal preventer.

15. The method of claim 12, further comprising activating a non-redundant mode of the redundant system when the first processor detects the first voltage state.

16. The method of claim 12, further comprising activating a visual indicator when the first processor detects the first voltage state.

17. The method of claim 12, further comprising activating a redundant mode when the first processor detects the second voltage state.

* * * * *